(12) United States Patent
Voth

(10) Patent No.: US 8,858,862 B2
(45) Date of Patent: Oct. 14, 2014

(54) MOULD CARRIER AND STRETCHING CARRIAGE VALVE

(75) Inventor: Klaus Voth, Obertraubling (DE)

(73) Assignee: Krones AG, Neutraubling (DE)

( * ) Notice: Subject to any disclaimer, the term of this patent is extended or adjusted under 35 U.S.C. 154(b) by 230 days.

(21) Appl. No.: 13/278,280

(22) Filed: Oct. 21, 2011

(65) Prior Publication Data

US 2012/0098166 A1     Apr. 26, 2012

(30) Foreign Application Priority Data

Oct. 21, 2010   (DE) .......................... 10 2010 049 025

(51) Int. Cl.
| | |
|---|---|
| *B29C 49/48* | (2006.01) |
| *B29C 49/56* | (2006.01) |
| *B29C 49/58* | (2006.01) |
| *B29C 49/78* | (2006.01) |
| *B29C 49/42* | (2006.01) |
| *B29C 49/06* | (2006.01) |
| *B29C 49/12* | (2006.01) |
| *B29C 49/46* | (2006.01) |

(52) U.S. Cl.
CPC .............. *B29C 49/783* (2013.01); *B29C 49/06* (2013.01); *B29C 2049/5875* (2013.01); *B29C 49/12* (2013.01); *B29C 49/56* (2013.01); *B29C 2049/4892* (2013.01); *B29C 49/58* (2013.01); *B29C 2049/563* (2013.01); *B29C 2049/4632* (2013.01); *B29C 49/46* (2013.01); *B29C 49/48* (2013.01); *B29C 49/4289* (2013.01)
USPC ............ 264/523; 425/522; 425/535; 425/541

(58) Field of Classification Search
CPC ................................................ B29C 2033/205
USPC ........................... 425/522, 535, 541; 264/523
See application file for complete search history.

(56) References Cited

U.S. PATENT DOCUMENTS

| | | | |
|---|---|---|---|
| 3,438,085 A | * | 4/1969 | Larkin .......................... 425/522 |
| 3,782,879 A | | 1/1974 | Mnilk et al. |
| 5,486,103 A | | 1/1996 | Meiring et al. |

(Continued)

FOREIGN PATENT DOCUMENTS

DE    10 2008 018 785 A1    10/2009

OTHER PUBLICATIONS

German Search Report dated Jun. 1, 2011, issued in corresponding German Patent Application No. 10 2010 049 025.3.

*Primary Examiner* — Robert B Davis
(74) *Attorney, Agent, or Firm* — Novak Druce Connolly Bove + Quigg $^{LLP}$

(57) ABSTRACT

A stretch blow molding machine may include a blow molding unit, having at least a first and a second mold carrier for receiving at least one mold part, which can be moved relative to one another, connected to one another to form a first working space for receiving the containers, and detached from one another to release the containers. A second working space may be formed between at least one mold part and at least the first mold carrier. A fluid communication system can feed a working fluid to the first and second spaces. At least one valve device for intermittent complete disconnection of fluid communication between at least one of the working spaces and the fluid system is arranged such that pressure of the working fluid within the fluid system is independent of changes in the state of the second space when the fluid communication is disconnected.

19 Claims, 3 Drawing Sheets

(56) References Cited

U.S. PATENT DOCUMENTS

| | | |
|---|---|---|
| 6,099,286 A | 8/2000 | Nitsche |
| 6,994,542 B2 * | 2/2006 | Tsau et al. .................. 425/541 |
| 7,563,089 B2 | 7/2009 | Dannebey et al. |
| 2005/0142243 A1 | 6/2005 | Tsau et al. |

* cited by examiner

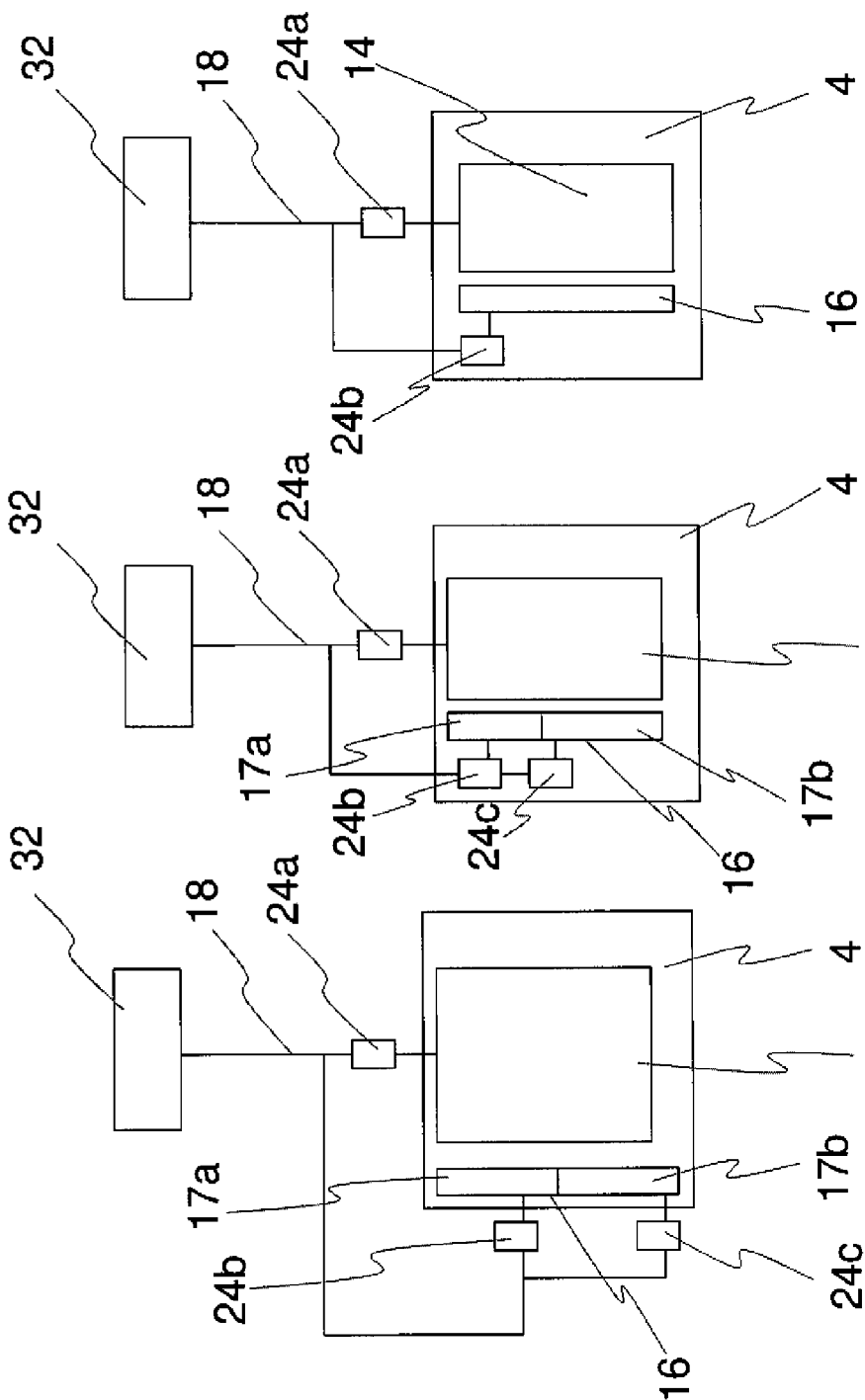

US 8,858,862 B2

MOULD CARRIER AND STRETCHING CARRIAGE VALVE

CROSS-REFERENCE TO RELATED APPLICATION

This application claims the benefit of priority of German Patent Application No. 10 2010 049 025.3, filed Oct. 21, 2010, pursuant to 35 U.S.C. 119(a)-(d), the disclosure of which is incorporated herein by reference.

TECHNICAL FIELD

The present disclosure relates to a stretch blow moulding machine for forming parisons of plastic into containers and a process for forming parisons of plastic into containers.

BACKGROUND

Devices and steps which are employed or carried out before, during and/or after forming of a parison of thermoelastic material are thus described in particular. An essential factor in this context is the provision and the use of a functional fluid. For forming parisons into containers, a working fluid which is very resources-intensive, in particular energy-intensive, in its production or conditioning, i.e. for example, amongst others, compression, purification and/or temperature control, is always provided.

US2005/0142243A1 discloses, for example, a blow moulding device according to which a working fluid can be introduced via a fluid communication system into a first working space for expanding the parison. Furthermore, the working fluid can also be fed via the same fluid communication system to a second working space, which is formed between a blowing mould part and a mould carrier, for charging the blowing mould part with a compressive force. In the case of removal of the bottle produced, the entire working fluid escapes from the fluid communication system, as a result of which for a further blow moulding operation the working fluid must be provided again not only in the volume of the working spaces but also in the volume of the fluid communication system.

Due to the resources-intensive conditioning of the working fluid, a significant potential for savings already results in small installations, and there is also the potential for reducing delays in time, since filling of the fluid communication systems in each case takes a certain time.

It may therefore be desirable to provide a device and a process by means of which the consumption of the working fluid necessary for forming parisons of plastic is reduced.

SUMMARY

According to various aspects of the disclosure, a stretch blow moulding machine for forming parisons of plastic into containers may comprise at least one blow moulding unit which has at least a first and a second mould carrier for receiving in each case at least one blowing mould part, which can be moved relative to one another, can be connected to one another to form a first working space for receiving the containers and can be detached from one another to release the containers, a second working space being formed between at least one blowing mould part and at least the first mould carrier, and a fluid communication system, in particular a line connection, for leading a working fluid which can be fed to the first working space and the second working space.

According to the disclosure, on the first mould carrier and/or on an expanding device, in particular a stretching rod, which is provided for feeding the working fluid into the inside of the containers, at least one valve device for intermittent complete disconnection of the fluid communication between at least one of the working spaces and the fluid communication system is arranged in a manner such that the pressure of the working fluid within the fluid communication system is independent of the changes in the state of the second working space when the fluid communication is disconnected. Changes in state can in some aspects be understood as meaning changes in pressure and/or changes in volume. Compared with the device known from the prior art, in a working cycle comprising receiving of a parison, forming of the parison into a container and release of the container, working fluid has to be provided only in the volume of the first and/or second working space, by means of which a device is provided which is considerably more resources-preserving results.

The parisons are in some aspects made of plastic, and in particular of PET. Containers can be understood as meaning, amongst others, buckets, beakers, boxes, bottles and/or canisters. The containers can in some aspects be of different sizes, containers of the same size in some aspects always being produced in a blow moulding unit of the present disclosure.

In addition to the first and second mould carrier, a third mould carrier can also be provided, the third mould carrier then in some aspects being arranged at least in sections in the region of the base of the container.

According to an exemplary embodiment of the present disclosure, the valve device is a high pressure valve device, and in particular exactly one or more high pressure valves.

This embodiment may be advantageous since the working fluid can be introduced into the working spaces with a pressure of from 20 bar to 60 bar, in some aspects from 30 bar to 50 bar, and in some aspects of approximately 40 bar or of exactly 40 bar.

According to an exemplary embodiment of the present disclosure, the valve device on the mould carrier can be moved in a first direction, in particular as a result of a swivelling movement around a common axis of the mould carriers, the valve device on the expanding device can be moved in a second direction, in particular in the vertical direction, and the entirety of the blow moulding unit and expanding device can be moved in a further direction, in particular in a plane on a conveyor belt which is in some aspects at least partly curved, in particular circular.

This embodiment may be advantageous since the valve device(s) can be moved together with the devices to which they are assigned, as a result of which movements of the valve device(s) relative to the assigned devices can be avoided. This means that the valve devices can be fixed in a very stable manner with respect to the assigned devices and the danger of wear due to, for example, continuous swivelling movements of the valve device with respect to the assigned device can be ruled out. Assigned devices can be understood here as meaning in each case, for example, the mould carriers or the expanding device (in particular a blow moulding die and/or stretching rod). In this context, the first direction and the second direction differ from the further direction.

According to an exemplary embodiment of the present disclosure, the valve device of the expanding device has a valve housing located on a linear carriage.

This embodiment may be advantageous since the valve device can thereby travel or be moved in the second direction with the expanding device.

According to an exemplary embodiment of the present disclosure, the valve housing of the valve device arranged on the first mould carrier is at least partly formed by the first mould carrier, or the valve device is a constituent of the first mould carrier, or the body of the valve is the first mould carrier and the function of a valve is to be found in the "mould carrier" component.

This embodiment may be advantageous since a very small design can be realized, as a result of which space and material can be saved. Furthermore, the lower material requirement results in a lower total weight of the moving devices, as a result of which driving energy can be saved. It is furthermore conceivable that the valve device is formed mostly or completely by the mould carrier. Location of the valve device on the mould carrier can thus also be understood as meaning location in the mould carrier.

According to an exemplary embodiment of the present disclosure, the working fluid is in some aspects a gas, such as for example air, and in some aspects pure air.

This embodiment may be advantageous since a gaseous working fluid can be fed very easily to the individual working spaces and likewise can be removed easily from these.

According to an exemplary embodiment of the present disclosure, the valve device can be activated actively.

This embodiment may be advantageous since an active activation can effect an opening and closing movement of the valve device(s), which makes possible a very efficient use of the working fluid. In this context it is conceivable that the valve device(s) can be actuated or are actuated electrically, hydraulically, mechanically and/or pneumatically.

According to an exemplary embodiment of the present disclosure, the first working space and the second working space are demarcated from one another by a movable wall, in particular a movable blowing mould.

This embodiment may be advantageous since the blowing mould can be displaced 0.1-2 mm, in some aspects 0.3-1 mm, and in some aspects approximately or exactly 0.5 mm to reduce surface irregularities of the container. The movable wall makes it possible for the mould carrier to be a mould locking mechanism, i.e. for the second working space to be charged with pressure, in particular a high pressure, when the mould carrier or the mould carriers are locked. This essentially corresponds to the function of a pneumatic cylinder. It is likewise conceivable that both mould carriers each have second working spaces which are connected at least intermittently to the fluid communication system via valve devices. It is furthermore conceivable that the valve of the mould locking mechanism is connected to the first mould carrier with a line connection, in particular a hose line or a pipe line.

According to an exemplary embodiment of the present disclosure, the volume of the first working space and the volume of the second working space correspond in total to the total working space volume.

This embodiment may be advantageous since e.g. there can be an exact control of how much working fluid is in which working space or in all the working spaces under what pressure. The volume of the fluid communication device is not regarded as the working volume, i.e. the volume of the fluid communication device is separated spatially and can be separated functionally from the working volume by the valve device(s). In some aspects, a working fluid source is coupled with or connected to the fluid communication system. It is furthermore conceivable that a temperature control device for temperature control of the containers, the working fluid, the blow moulding unit and/or the expanding device is provided upstream of the valve device.

The present disclosure also relates to a process for forming parisons of plastic into containers, which comprises at least the steps mentioned below. The first step relates to the provision of a working fluid by means of a fluid communication system for leading the working fluid from a fluid source to at least a first valve device, which intermittently separates a first working space completely from the fluid communication system, and/or at least a second valve device, which intermittently separates a second working space from the fluid communication system, the first working space being formed by at least a first and a second mould carrier for receiving in each case at least one blowing mould part, which can be moved relative to one another, can be connected to one another and can be detached from one another to release the containers and a second working space being formed at least between one blowing mould part and the first mould carrier. The second step relates to disconnection of the fluid communication between the fluid communication system and the second working space.

According to the disclosure, when the fluid communication is disconnected a change in state is effected in the second working space independently of the state of the working fluid in the fluid communication system.

Further advantages, aims, and properties of the present disclosure are explained with the aid of drawings attached to the following description, in which stretch blow moulding machines and blow moulding units for forming parisons of plastic into containers are shown by way of example. Components of the stretch blow moulding machine and of the blow moulding unit which at least essentially coincide with respect to their function in the figures can be identified here with the same reference symbols, these components not having to be referenced or explained in all the figures.

BRIEF DESCRIPTION OF THE DRAWINGS

In the figures:

FIGS. 3a-3c are schematic diagrams of various exemplary valve arrangements.

DETAILED DESCRIPTION

Figure 1:
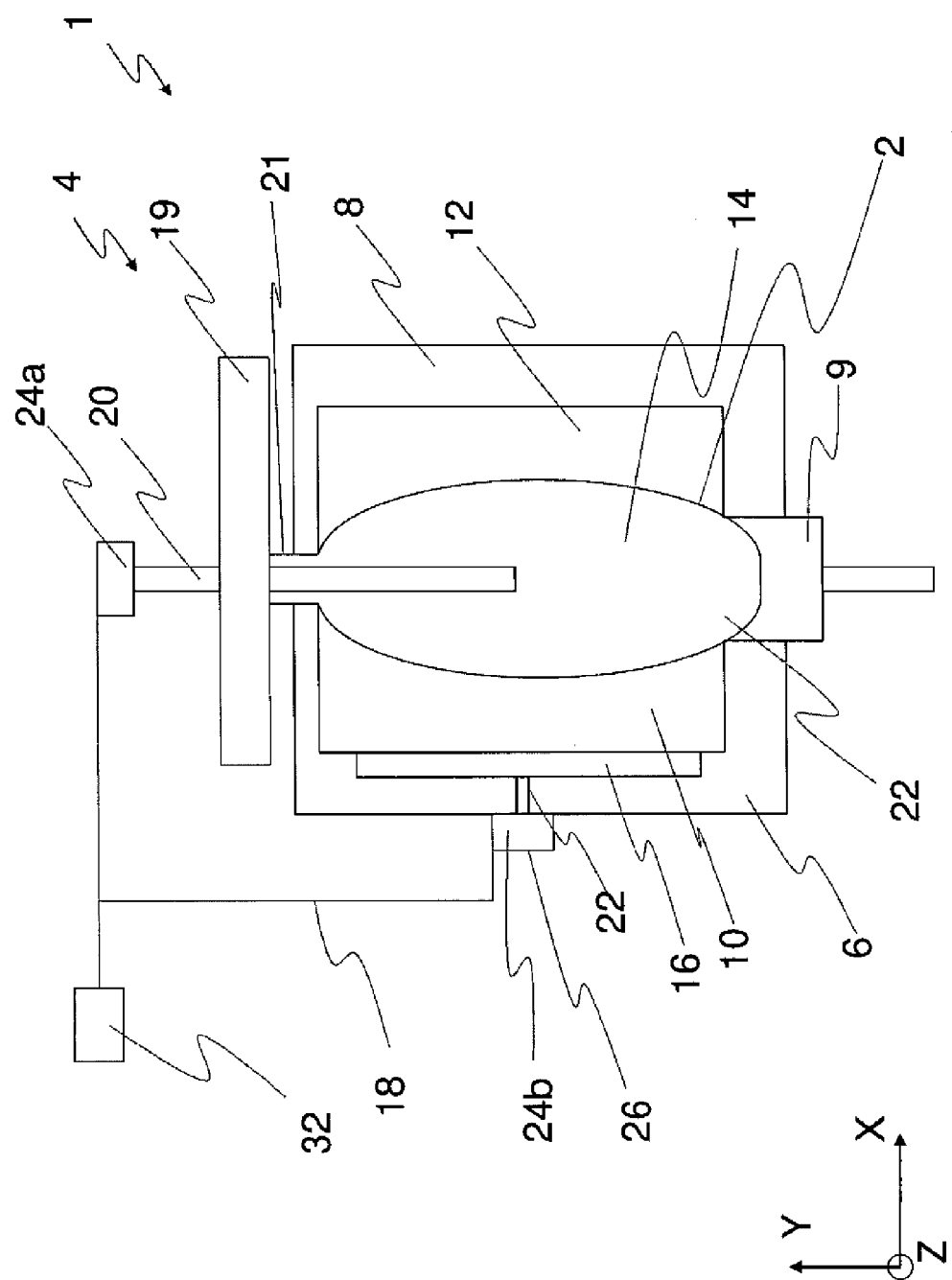
FIG. 1 is a schematic diagram of a cross-section of a part of an exemplary blow moulding machine according to various aspects of the disclosure.

In FIG. 1, a stretch blow moulding machine is identified with reference symbol 1. The stretch blow moulding machine 1 is shown only in part and serves to form parisons into containers 2. The reference symbol 4 identifies the blow moulding unit, which comprises at least a first mould carrier 6 and a second mould carrier 8. As shown in FIG. 1, however, it is also conceivable that the blow moulding unit has another or several further mould carriers 9 or mould units. A mould unit is to be understood here as meaning a device which has a surface section which corresponds to the negative form of a surface section of the container 2.

The first mould carrier 6 in some aspects serves to accommodate a first blowing mould part 10, which is a movable wall. The second mould carrier 8 in some aspects likewise serves to accommodate a blowing mould part 12. In some aspects, the second mould carrier 8 and the second blowing mould part 10 are arranged immovably relative to one another, it being conceivable that the blowing mould parts 10, 12 are replaceable.

The inner surfaces of the blowing mould parts 10, 12, i.e. the surface parts facing the centre of the blow moulding unit 4, demarcate a hollow space which represents a first working space 14. A second working space 16 is in some aspects demarcated by a part of the outer surface of the first blowing mould part 10 and a part of the inner surface of the first mould carrier 6.

By means of a fluid communication system 18 which comprises lines, in particular pipe lines and/or hose lines, a working fluid can be fed from a source 32, which can be, for example, amongst others, a further fluid communication system 18, a valve device, a reservoir and/or a compressor unit, to the valves 24a, 24b. The valves 24a, 24b separate the fluid communication system 18 spatially and intermittently functionally from the first and the second working space 14, 16. A functional separation can be understood here as meaning an interruption in the fluid communication between the fluid communication system 18 and at least one and in some aspects all the working spaces 14, 16. When the valve device 24a is open, entry of the working fluid into the first working space 14 through the valve device 24a is possible. The first working space 14 thus in some aspects extends downwards from the valve device 24a in the fluid flow direction.

For flushing the container 2 after the valve device 24a within the expanding device 20, which in some aspects is a stretching rod, the working fluid flows through a sealing device 19, which at least partly and/or intermittently prevents exit of the working fluid from the container 2. The sealing action is in some aspects effected by cooperation of the opening 21 of the container 2, in particular a mandrel support thereof, with the sealing device 19.

The second working space 16 is in some aspects connected to the valve device 24b via a connecting piece 22, the connecting piece 22 in some aspects forming a part of the second working space 16. The valve devices 24a, 24b in some aspects have a valve housing 26, which can be located on the first mould carrier 6 or on the expanding device 20. In some aspects, the valve housing 26 or the valve devices 24a, 24b are located directly on the first mould carrier 6 or on the expanding device 20.

The mould carriers 6, 8 can in some aspects be moved in the X direction, in particular horizontally, and the expanding device 20 together with the valve device 24a can in some aspects be moved in the Y direction, in particular vertically, and the blow moulding unit 4 can be transported on a belt, in some aspects a circular belt.

Figure 2:
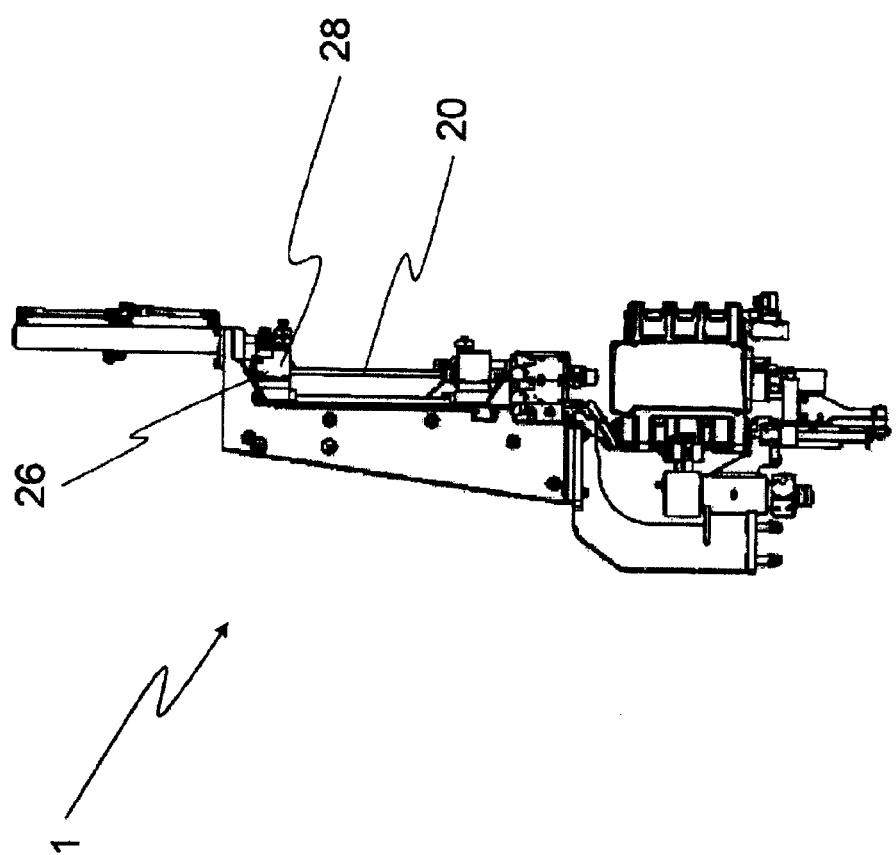
FIG. 2 is a two-dimensional side view of a part of an exemplary blow moulding machine according to various aspects of the disclosure.

FIG. 2 shows a two-dimensional diagram of a part of a stretch blow moulding machine 1. In this context, the part of the stretch blow moulding machine 1 shown comprises, amongst others, the first and second mould carriers 6, 8, the stretching rod 20 and the linear carriage 28, in particular a stretching carriage, on which the valve housing 26 is arranged. The stretching rod 20 is in some aspects connected to the valve housing 26 or arranged directly thereon or alongside it and thus moves with it as a result of a movement of the linear carriage 28, and in some aspects the stretching rod 20 is received in the valve housing 26.

FIGS. 3a-3c show various schematic diagrams, each of which represent different constructions of the fluid communication system 18 or of the valve arrangement(s).

In FIG. 3a, the valve devices 24b and 24c are linked in parallel with one another into the fluid communication system 18. The valve devices 24b and 24c are also arranged not directly on the blow moulding unit 4 or on the first mould carrier (not identified), but at a distance therefrom, the valve device(s) 24b, 24c in some aspects also being arranged or formed on the first mould carrier 6 or at least one of the valve devices 24b, 24c being arranged or formed on the first mould carrier 6. Parts of the second working space 16 are identified by the reference symbols 17a and 17b. These parts 17a, 17b can in turn be connected to one another via a valve device.

It can furthermore be seen from this diagram that the entire fluid communication system 18 can be separated completely from the first and the second working space 14, 16 via the valve devices 24a-24c, or a fluid communication between the fluid communication system 18 and the first and second working spaces 14, 16 can be stopped completely. The pressure of the working fluid within the fluid communication system 18 when the fluid communication is disconnected is therefore independent of the changes in the state of the second working space 16, as a result of which in a working cycle comprising accommodation of a parison, forming of the parison into a container and release of the container, working fluid has to be provided only in the volume of the first and/or second working space 14, 16.

In FIG. 3b two valve devices 24b, 24c are likewise provided, these being arranged one after the other, i.e. in series. In this diagram the valve devices 24b, 24c are arranged in or on the blow moulding unit 4, in particular on the first mould carrier 6.

It thus emerges from FIGS. 3a and 3b that any desired "circuits" of any desired number of valve devices, i.e. parallel circuits or series circuits or combined parallel/series circuits, can be provided.

FIG. 3c shows a diagram according to which only one valve device 24b is provided, which connects the second working space 16 to the fluid communication system 18. The valve device 24b is also arranged in or on the first mould carrier 6.

It will be apparent to those skilled in the art that various modifications and variations can be made to the mould carrier and stretching carriage valve of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:

1. Stretch blow moulding machine for forming parisons of plastic into containers, comprising:

a blow moulding unit which has at least a first mould carrier and a second mould carrier for accommodating in each case at least one blowing mould part, the first and second mould carriers being movable relative to one another, connectable to one another to form a first working space for receiving the containers, and detachable from one another to release the containers, a second working space being formed between at least one blowing mould part and at least the first mould carrier; and a fluid communication system for leading a working fluid which is feedable to the first working space and the second working space, wherein, on at least one of the first mould carrier and an expanding device, which is provided for feeding the working fluid into the inside of the containers, wherein at least two valve devices are provided to separate the fluid communication system from the first and the second working space, wherein at least one valve device for intermittent complete disconnection of the fluid communication between at least one of the working spaces and the fluid communication system is arranged in a manner such that the pressure of the working fluid within the fluid communication system is independent of the changes in the state of the second working space when the fluid communication is disconnected.

2. Stretch blow moulding machine according to claim 1, wherein the at least one valve device is a high pressure valve device.

3. Stretch blow moulding machine according to claim 1, wherein the valve device on the first mould carrier is movable in a first direction, the valve device on the expanding device is movable in a second direction, and the entirety of the blow moulding unit and expanding device is movable in a third direction on a conveyor belt.

4. Stretch blow moulding machine according to claim 1, wherein the valve housing of the valve device of the expanding device is located on a linear carriage.

5. Stretch blow moulding machine according to one of claim 1, wherein the valve housing of the valve device arranged on the first mould carrier is at least partly formed by the first mould carrier.

6. Stretch blow moulding machine according to claim 1, wherein the working fluid is a gas.

7. Stretch blow moulding machine according to claim 6, wherein the gas is pure air.

8. Stretch blow moulding machine according to claim 1, wherein the at least one valve device is actively activatable.

9. Stretch blow moulding machine according to claim 1, wherein the first working space and the second working space are demarcated from one another by a movable wall.

10. Stretch blow moulding machine according to claim 9, wherein the movable wall is a movable blowing mould part.

11. Stretch blow moulding machine according to claim 1, wherein the volume of the first working space and the volume of the second working space correspond in total to the total working space volume.

12. Process for forming parisons of plastic into containers, comprising at least the steps:
    providing a blow moulding unit which has at least a first mould carrier and a second mould carrier for accommodating in each case at least one blowing mould part, the first and second mould carriers being movable relative to one another, connectable to one another to form a first working space for receiving the containers, and detachable from one another to release the containers, a second working space being formed between at least one blowing mould part and at least the first mould carrier; and
    providing a fluid communication system for leading a working fluid which is feedable to the first working space and the second working space;
    providing a first valve device, which intermittently separates the first working space completely from the fluid communication system, and a second valve device, which intermittently separates the second working space from the fluid communication system, at least one of the first and second valve devices being provided on at least one of the first mould carrier and an expanding device, the expanding device being provided for feeding the working fluid into the inside of the containers;
    providing a working fluid by means of the fluid communication system for leading the working fluid from a fluid source to at least one of the first valve device and the second valve device; and
    disconnecting the fluid communication between the fluid communication system and the second working space, wherein, when the fluid communication is disconnected, a change in state is effected in the second working space independently of the state of the working fluid in the fluid communication system.

13. Stretch blow moulding machine for forming parisons of plastic into containers, comprising:
    a blow moulding unit which has at least a first mould carrier and a second mould carrier for accommodating in each case at least one blowing mould part, the first and second mould carriers being movable relative to one another, connectable to one another to form a first working space for receiving the containers, and detachable from one another to release the containers, a second working space being formed between at least one blowing mould part and at least the first mould carrier; and
    a fluid communication system for leading a working fluid which is feedable to the first working space and the second working space,
    wherein, on at least one of the first mould carrier and an expanding device, which is provided for feeding the working fluid into the inside of the containers, at least one valve device for intermittent complete disconnection of the fluid communication between at least one of the working spaces and the fluid communication system is arranged in a manner such that the pressure of the working fluid within the fluid communication system is independent of the changes in the state of the second working space when the fluid communication is disconnected, wherein the valve device on the first mould carrier is movable in a first direction, the valve device on the expanding device is movable in a second direction, and the entirety of the blow moulding unit and expanding device Is movable in a third direction.

14. Stretch blow moulding machine for forming parisons of plastic into containers, comprising:
    a blow moulding unit which has at least a first mould carrier and a second mould carrier for accommodating in each case at least one blowing mould part, the first and second mould carriers being movable relative to one another, connectable to one another to form a first working space for receiving the containers, and detachable from one another to release the containers, a second working space being formed between at least one blowing mould part and at least the first mould carrier; and
    a fluid communication system for leading a working fluid which is feedable to the first working space and the second working space,
    wherein, on at least one of the first mould carrier and an expanding device, which is provided for feeding the working fluid into the inside of the containers, at least one valve device for intermittent complete disconnection of the fluid communication between at least one of the working spaces and the fluid communication system is arranged in a manner such that the pressure of the working fluid within the fluid communication system is independent of the changes in the state of the second working space when the fluid communication is disconnected, wherein the valve housing of the valve device of the expanding device is located on a linear carriage.

15. Stretch blow moulding machine according to claim 1, wherein in addition to the first and second mould carrier a third mould carrier is provided.

16. Stretch blow moulding machine according to claim 15, wherein the third mould carrier is arranged in sections in the region of the base of the container.

17. Stretch blow moulding machine according to claim 1, wherein the blowing mould can be displaced to reduce surface irregularities of the container.

18. Stretch blow moulding machine according to claim 1, wherein the machine comprises a stretching rod.

19. Stretch blow moulding machine according to claim 18, wherein the stretching rod is connected with a valve housing.

* * * * *